United States Patent
Lin et al.

(10) Patent No.: US 7,961,806 B2
(45) Date of Patent: Jun. 14, 2011

(54) POWER ADAPTIVE CHANNEL ESTIMATION FOR A MULTI-PATH RECEIVING

(75) Inventors: Che-Li Lin, Taipei (TW); Shun-An Yang, Changhua County (TW)

(73) Assignee: Mediatek Inc., Hsin-Chu (TW)

( * ) Notice: Subject to any disclaimer, the term of this patent is extended or adjusted under 35 U.S.C. 154(b) by 793 days.

(21) Appl. No.: 11/625,859

(22) Filed: Jan. 23, 2007

(65) Prior Publication Data

US 2008/0175328 A1  Jul. 24, 2008

(51) Int. Cl.
*H04L 27/28* (2006.01)
*H04L 5/12* (2006.01)

(52) U.S. Cl. ........................................ 375/262; 375/260
(58) Field of Classification Search .................. 375/260, 375/262, 265, 267, 340, 341, 346, 350; 370/208, 370/210
See application file for complete search history.

(56) References Cited

U.S. PATENT DOCUMENTS

| | | | |
|---|---|---|---|
| 7,450,654 B2 * | 11/2008 | Singh et al. | 375/260 |
| 2003/0231709 A1 * | 12/2003 | Pare et al. | 375/233 |
| 2005/0185724 A1 * | 8/2005 | Wang et al. | 375/260 |
| 2005/0265490 A1 * | 12/2005 | Sestok et al. | 375/340 |
| 2006/0146690 A1 * | 7/2006 | Zhang et al. | 370/203 |
| 2006/0239178 A1 * | 10/2006 | Svensson et al. | 370/208 |
| 2007/0064824 A1 * | 3/2007 | Wang et al. | 375/260 |
| 2007/0070882 A1 * | 3/2007 | Kawauchi et al. | 370/210 |
| 2007/0076804 A1 * | 4/2007 | Sestok et al. | 375/260 |
| 2008/0317153 A1 * | 12/2008 | Sadek et al. | 375/262 |

FOREIGN PATENT DOCUMENTS

EP   1335552   8/2003

* cited by examiner

*Primary Examiner* — Young T. Tse
(74) *Attorney, Agent, or Firm* — Thomas | Kayden

(57) ABSTRACT

A multi-path receiving system is provided. The multi-path receiving system includes a multi-path analyzer, a channel estimator and an equalizer. The multi-path analyzer analyzes a channel impulse response (CIR) of the multi-path channel from the received stream. The channel estimator calculates a channel estimation result from the received stream. The channel estimator comprises a frequency domain interpolation filter performing channel estimation. The frequency domain interpolation filter consumes an amount of power according to the CIR result output from the multi-path analyzer. The equalizer equalizes the received stream based on the channel estimation result.

17 Claims, 8 Drawing Sheets

POWER ADAPTIVE CHANNEL ESTIMATION FOR A MULTI-PATH RECEIVING

BACKGROUND OF THE INVENTION

Field of the Invention

The invention relates to channel estimation techniques, and, more particularly, to adaptive channel estimation in OFDM systems.

Multi-carrier modulation methods, such as orthogonal frequency division multiplexing (OFDM), have been in use for some time now. OFDM technique is a modulation method designed in the 1970's in which multiple symbols are transmitted in parallel using extensive sub-carriers. An OFDM system forms symbols by taking k complex QAM symbols $X_k$, each modulating a sub-carrier with frequency $$f_k = \frac{k}{T_u},$$

where $T_u$ is the sub-carrier symbol period. Each OFDM sub-carrier displays a $$\operatorname{sinc}(x) = \frac{\sin(x)}{x}$$

spectrum in the frequency domain. By spacing each of the 2N+1 sub-carriers $$\frac{1}{T_u}$$

apart in the frequency domain, the primary peak of each sub-carrier sin c (x) spectrum coincides with a null of the spectrum of every other sub-carrier. Thus, although the spectra of the sub-carriers overlap, the cross-interference between each sub-carrier is suppressed. OFDM is well known as an efficient highly spectral transmission scheme capable of addressing severe channel impairment encountered in a wireless environment.

During wireless communication, such as OFDM transmission, it is necessary to estimate the channel transfer function H(s) of the sub-carriers. The precision of channel estimation is largely determined by reception quality. A frequency equalizer (FEQ) further takes an inverse $H^{-1}(s)$ of the estimated channel transfer function to determine equalization coefficients of a frequency equalizer.

The estimation of the channel transfer function H(s) in OFDM system may rely on a frequency domain interpolation filter. A frequency domain interpolation filter interpolates information contained on pilot sub-carriers to calculate the channel transfer function H(s). It is advantageous to reduce the power consumed by the frequency domain interpolation filter.

BRIEF SUMMARY OF THE INVENTION

Accordingly, a multi-path receiving system having adaptive channel estimation for receiving a stream passing through a multi-path channel is provided. The multi-path receiving system includes a multi-path analyzer, a channel estimator and an equalizer. The multi-path analyzer analyzes a channel impulse response (CIR) of the multi-path channel from the received stream. The channel estimator calculates a channel estimation result from the received stream. The channel estimator comprises a frequency domain interpolation filter performing channel estimation. The frequency domain interpolation filter consumes an amount of power according to the CIR result output from the multi-path analyzer. The equalizer equalizes the received stream based on the channel estimation result.

A channel estimation method for a stream receiving from a multi-path channel is also provided. The method begins by converting a received stream from time domain to frequency domain. A channel impulse response of the multi-path channel is analyzed from the received stream, and channel quality of the channel impulse response is determined. A channel estimation result is calculated from the received stream by a frequency domain interpolation filter. An amount of power consumed by the frequency domain interpolation filter depends on the determined channel quality. The stream is then equalized by an equalizer according to the channel estimation result.

BRIEF DESCRIPTION OF THE DRAWINGS

The invention will become more fully understood from the detailed description, given herein below, and the accompanying drawings. The drawings and description are provided for purposes of illustration only, and, thus, are not intended to be limiting of the invention.

DETAILED DESCRIPTION OF THE INVENTION

Figure 1:
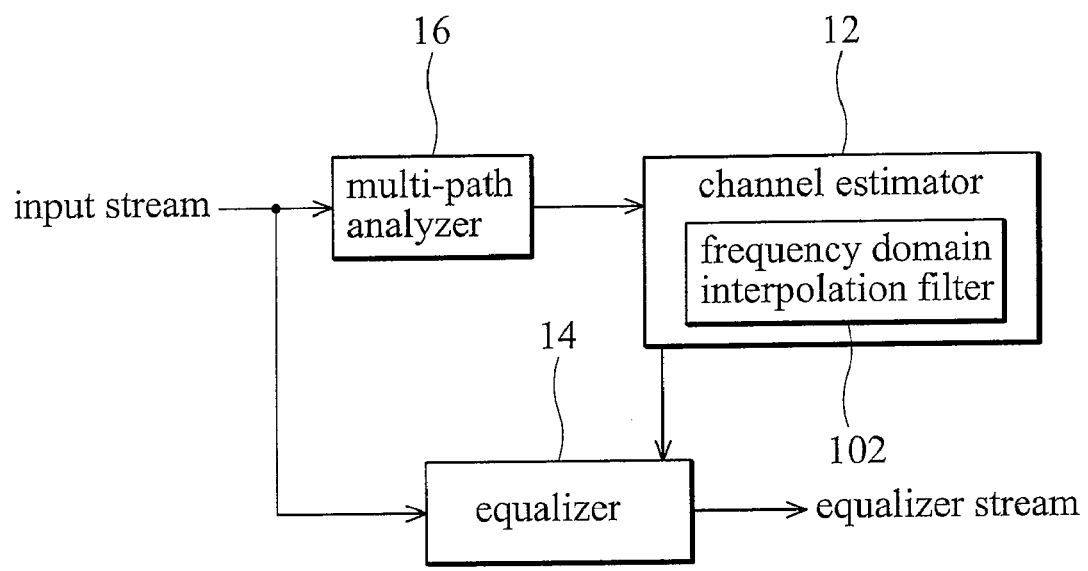
FIG. 1 shows a block diagram of a multi-path receiving system.

FIG. 1 shows a block diagram of an embodiment of a multi-path receiving system having adaptive channel estimation for receiving a stream passing through a multi-path channel. The multi-path receiving system comprises a multi-path analyzer 16, a channel estimator 12 and an equalizer 14. The multi-path analyzer 16 analyzes a channel impulse response (CIR) of the multi-path channel from the received stream. The channel estimator 12 calculates a channel estimation result from the received stream. The channel estimator 12 comprises a frequency domain interpolation filter 102 performing channel estimation using frequency domain interpolation. The frequency domain interpolation filter 102 consumes an amount of power according to the CIR result output from the multi-path analyzer 16. The equalizer 14 equalizes the received stream based on the channel estimation result.

For example, when the multi-path analyzer 16 upon analyzing a channel quality according to the CIR, the channel estimator controls a filter length of the frequency domain interpolator filter 102 according to the channel quality. The power consumed by the frequency domain interpolation filter 102 is related to the filter length.

Figure 2A:
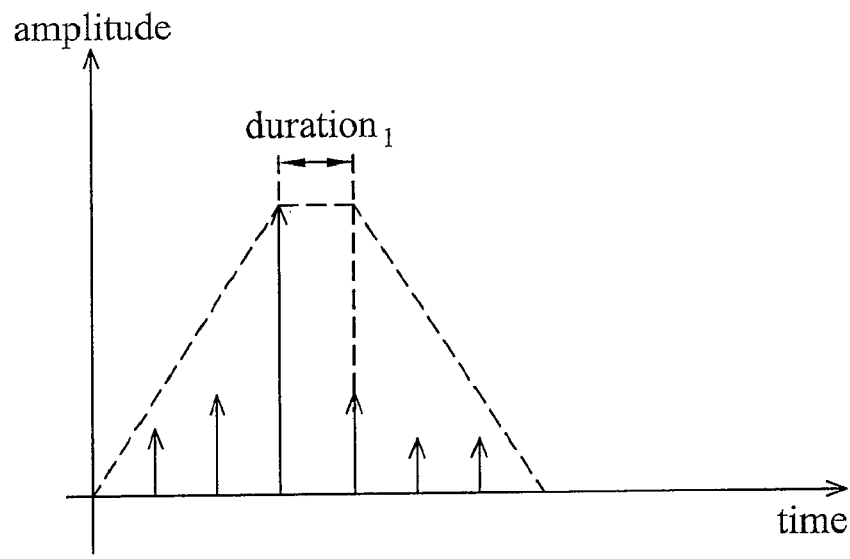
FIG. 2a and 2b show two examples of channel impulse response with different channel qualities.
Figure 2B:
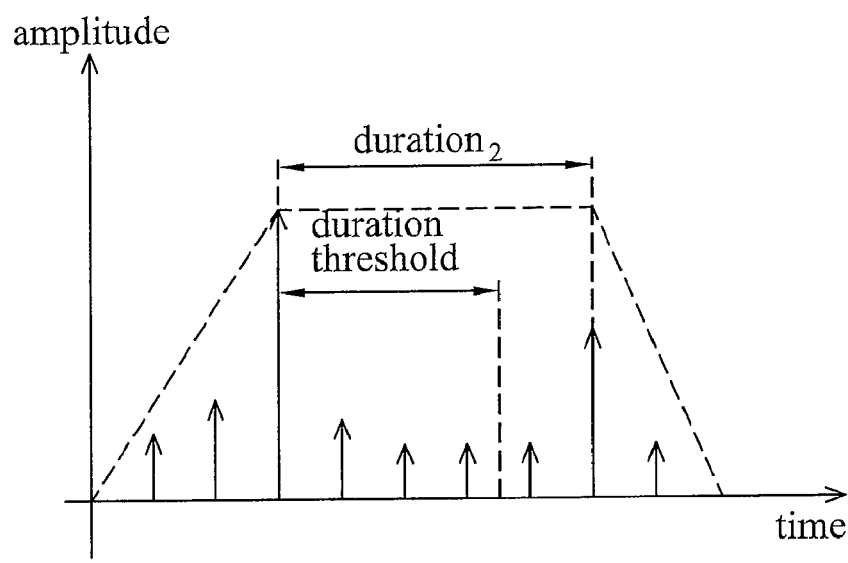
Figure 3A:
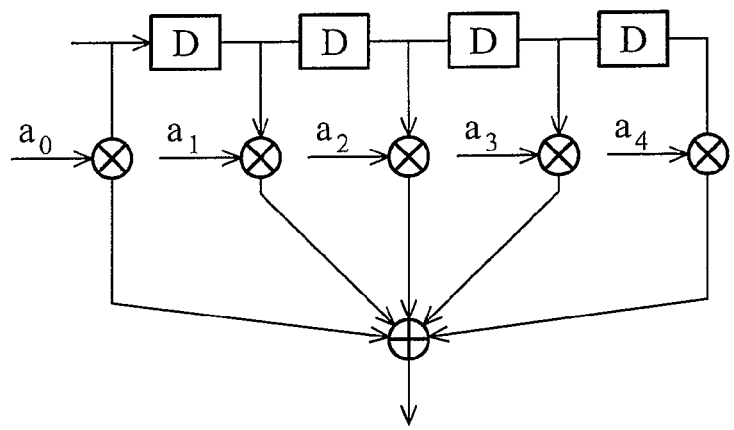
FIG. 3a and FIG. 3b show two exemplary frequency domain interpolation filters for filtering the channel impulse response shown in FIG. 2a and 2b, respectively.
Figure 3B:
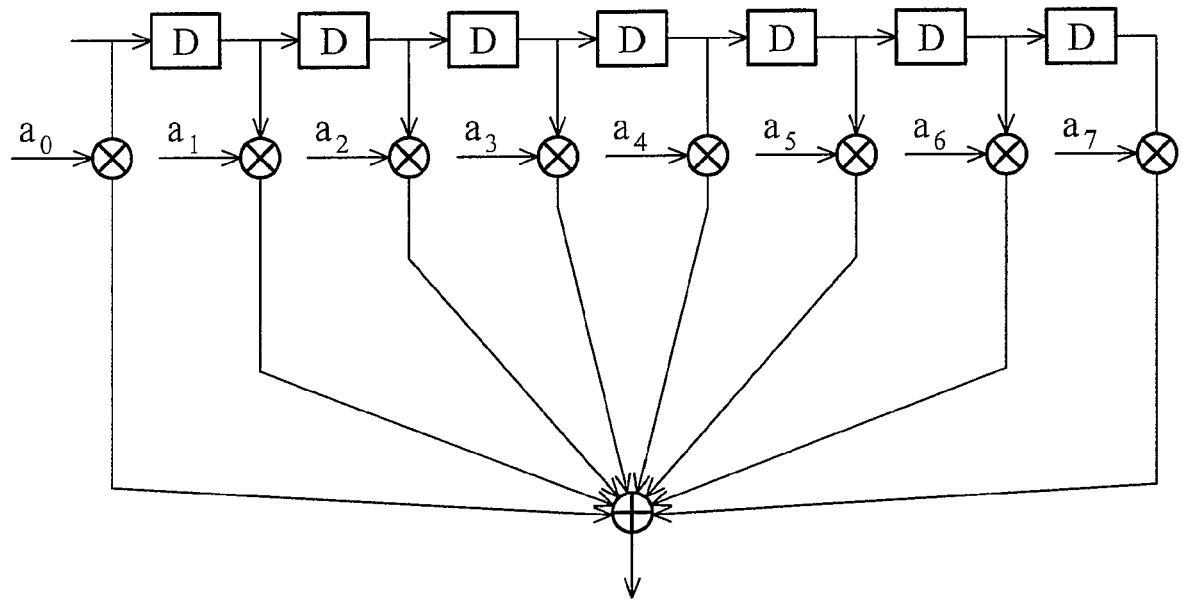

The channel quality can be evaluated by several criteria. For example, the multi-path analyzer 16 may measure the duration between two most significant paths of the CIR. If the duration between the two most significant paths is less than a duration threshold, the channel estimator determines channel quality is good. The filter length of the frequency domain interpolation filter 102 is shortened in response of the channel quality. Conversely, if the duration between the two most significant paths exceeds the duration threshold, the channel estimator determines channel quality is poor. The filter length of the frequency domain interpolation filter 102 is lengthened in response to the poor channel quality. FIGS. 2a and 2b show two examples of channel impulse response with different channel qualities. FIG. 2a shows the duration of the two most significant paths ($duration_1$) is proximately close, indicating that the two paths may come from the same signal source. FIG. 2b shows that the duration of the two most significant paths of a channel impulse response ($duration_2$) is separated by a distance and is longer than a duration threshold. The channel as shown in FIG. 2b is one type of multi-path channel, which is commonly encountered in single frequency network. Compared with FIG. 2a, the channel impulse response in FIG. 2b requires a higher order interpolation filter, i.e. a longer filter length. Thus, when the channel quality is as poor as shown in FIG. 2b, the frequency domain interpolation filter 102 lengthens the tap length of the filter. FIG. 3b shows an exemplary frequency domain interpolation filter 102 for filtering the channel impulse response as shown in FIG. 2b. When the channel quality is changed from FIG. 2b to FIG. 2a, the frequency domain interpolation filter 102 may be reduced from a 7-tap filter to a 4-tap filter, as shown in FIG. 3a.

Figure 4A:
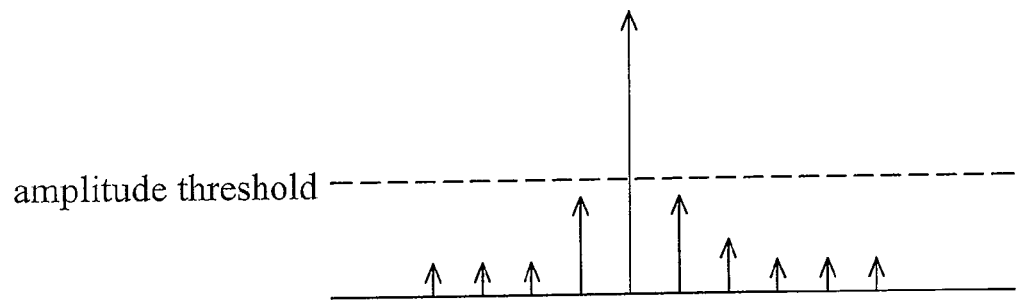
FIG. 4a illustrates a channel impulse response with only one main path.
Figure 4B:
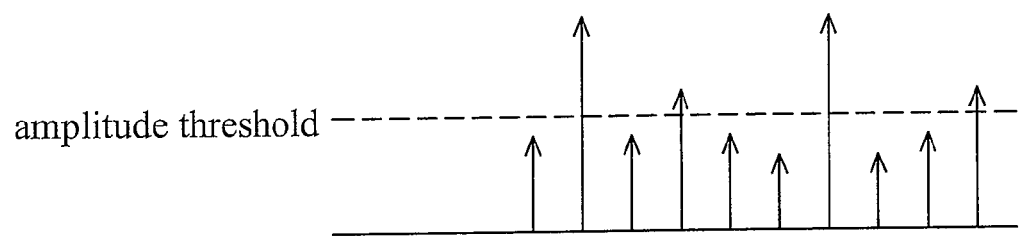
FIG. 4b shows a channel impulse response with four main paths.

In some device embodiments, the channel estimator 12 detects the number of paths in CIR that exceeds an amplitude threshold. For example, FIG. 4a illustrates that only one path exceeds the amplitude threshold, and FIG. 4b shows that four paths exceed the amplitude threshold. The channel impulse response in FIG. 4b is spread wider than the channel impulse response in FIG. 4a is. Thus, the frequency domain interpolation filter 102 allocate more filter taps when receiving a channel impulse response like FIG. 4b shown, and turns off an appropriate number of frequency domain interpolation filter taps when receiving a channel impulse response such as that shown in FIG. 4a.

The channel impulse responses in FIG. 2a, 2b, 4a, and 4b are provided for purposes of illustrating the function of the invention only and are not intended to be limiting. The invention is not limited to solving only the channel impulse responses shown in FIGS. 2a, 2b, 4a and 4b.

Figure 5:
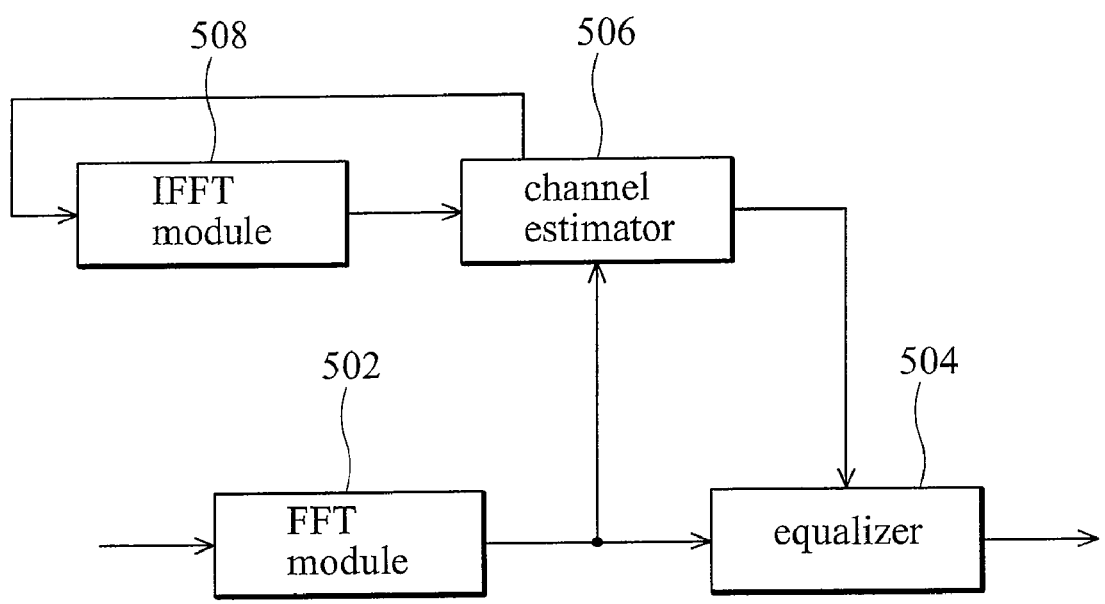
FIG. 5 shows another exemplary block diagram of power adaptive equalizer.

In some device embodiments, the channel estimation may be derived from the combination of an FFT module and an IFFT module. FIG. 5 shows an exemplary block diagram of multi-path receiving system 50. A Fast Fourier transform (FFT) module 502 applies FFT processing to streams of time-series data that has undergone propagation path compensation, and transforms the time-series data into a plurality of sub-carriers. An equalizer 504 equalizes the sub-carriers in the frequency domain. A channel estimator 506 detects the channel profile according to the pilot sub-carriers. An IFFT module 508 transforms the frequency domain channel profile into the time domain, the so-called channel impulse response. The channel estimator 506 determines the channel quality and determines the filter length of a frequency domain interpolation filter 510.

Figure 6:
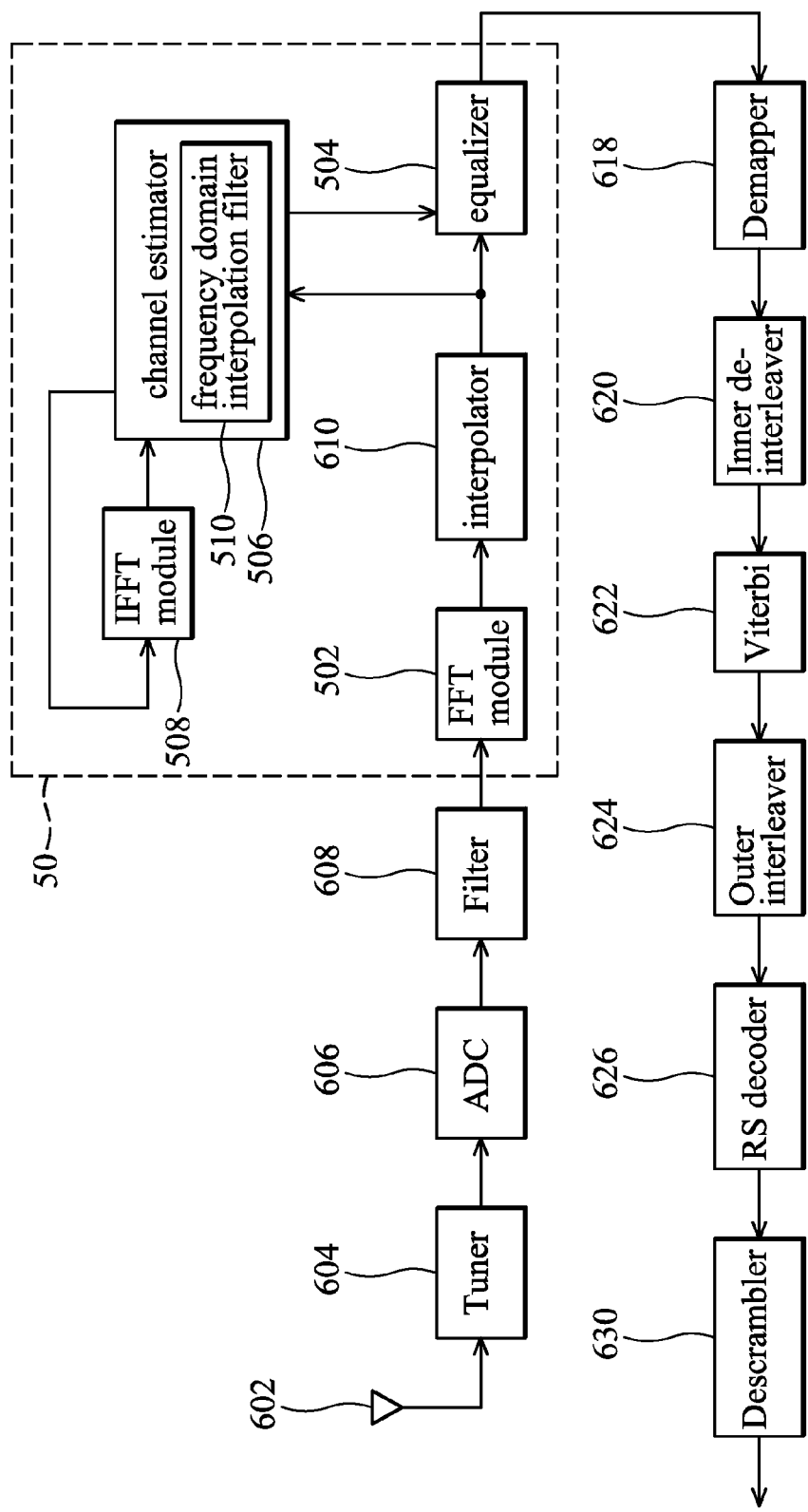
FIG. 6 shows a block diagram of an OFDM demodulator employing power adaptive channel estimation according to an embodiment of the invention.

The power adaptive equalizer 50 in FIG. 5 can be applied in an OFDM demodulator. FIG. 6 shows a block diagram of an OFDM demodulator employing power adaptive equalization. In the receiver system, an antenna 602 is used to receive RF signals. The received RF signal is an analog signal and is converted from an analog representation to a digital one by an analog-to-digital converter (ADC) 606. The converted signal is then filtered with a filter 608 to remove interference and noise which is outside of the bandwidth of the transmitted overall composite signal. The functions of FFT module 502, equalizer 504, channel estimator 506, IFFT module 508 and interpolator will be described in following paragraphs. The equalized signal is de-mapped by a De-mapper 618. The de-mapped signal is channel decoded by inner-deinterleaver 620, Viterbi decoder 622, outer interleaver 624, Reed-Solomn decoder 626, and descrambler 630.

Figure 7:
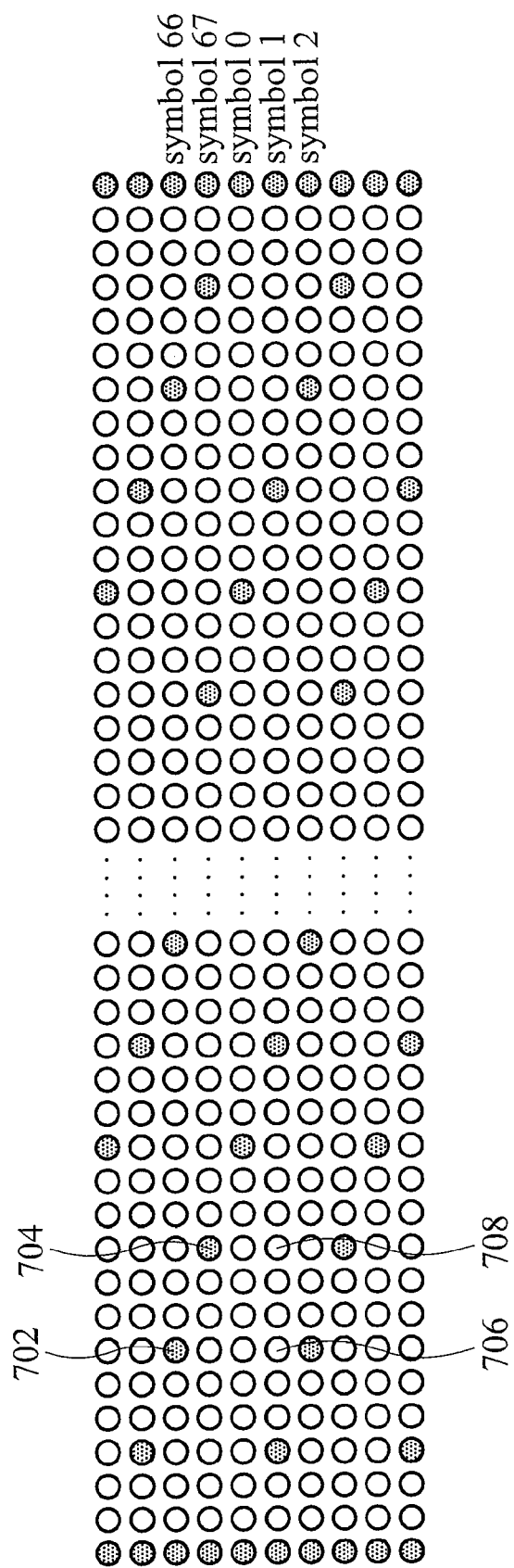
FIG. 7 shows the scattered pilots in a DVB-T OFDM frame.

In wireless communications system using OFDM-based modulation transmitters, pilot sub-carriers are transmitted among data sub-carriers to aid in channel estimation. The pilot positions in an OFDM vary by transmission standard. In the following description, the DVB-T (Digital Video Broadcasting-Terrestrial) specification, a contemporary OFDM scheme, is set forth in order to provide a thorough understanding of the present invention. However, it will be apparent to one skilled in the art that the present invention is not limited DVB-T. FIG. 7 shows the scattered pilot in a DVB-T OFDM frame. A DVB-T OFDM frame comprises 68 OFDM symbols. A pilot sub-carrier, represented as a dot in FIG. 7, is inserted every 11 data sub-carriers, and the pilot positions shift 3 sub-carriers after one symbol duration. For example, a pilot 702 is inserted in position index 7 of symbol 66; at symbol 67, a pilot is inserted in position index 10. Therefore, a position will not be inserted a pilot until 4 symbol durations have passed. For example, the position index 7 of symbol 2 will be inserted in a pilot. The interpolator 610 in FIG. 6 receives the plurality of pilots for at least 4 symbol durations, and interpolates pilots every 3 sub-carriers. Take symbol 1 for example, a pseudo pilot in position index 7 is interpolated from symbol 66 and symbol 2. The pseudo pilot in position index 10 is interpolated from symbol 67 and symbol 3. The interpolator 510 then interpolates pilots at each sub-carrier. For example, the pilots in position index 2 and 3 are interpolated from pilots with position index 1 and 4. The pilots in position index 5 and 6 are interpolated from pilots with position index 4 and 7. The pilot-interpolated symbol, representing the frequency response of the multi-path channel, is sent to the IFFT module 508. The IFFT module 508 generates a channel impulse response from the frequency response. The channel estimator 506, coupled to the IFFT module 508, detects a channel impulse response of a multi-path channel from a received stream. The channel estimator 506 calculates a channel estimation result from the interpolated stream. The channel estimator 506 comprises a frequency domain interpolation filter 510 performing channel estimation using frequency domain interpolation. The frequency domain interpolation filter 510 consumes an amount of power according to a channel quality. The equalizer 504 equalizes the received stream based on the channel estimation result. The determination of channel quality is similar to that described in FIG. 2, hence, description thereof is omitted.

Figure 8:
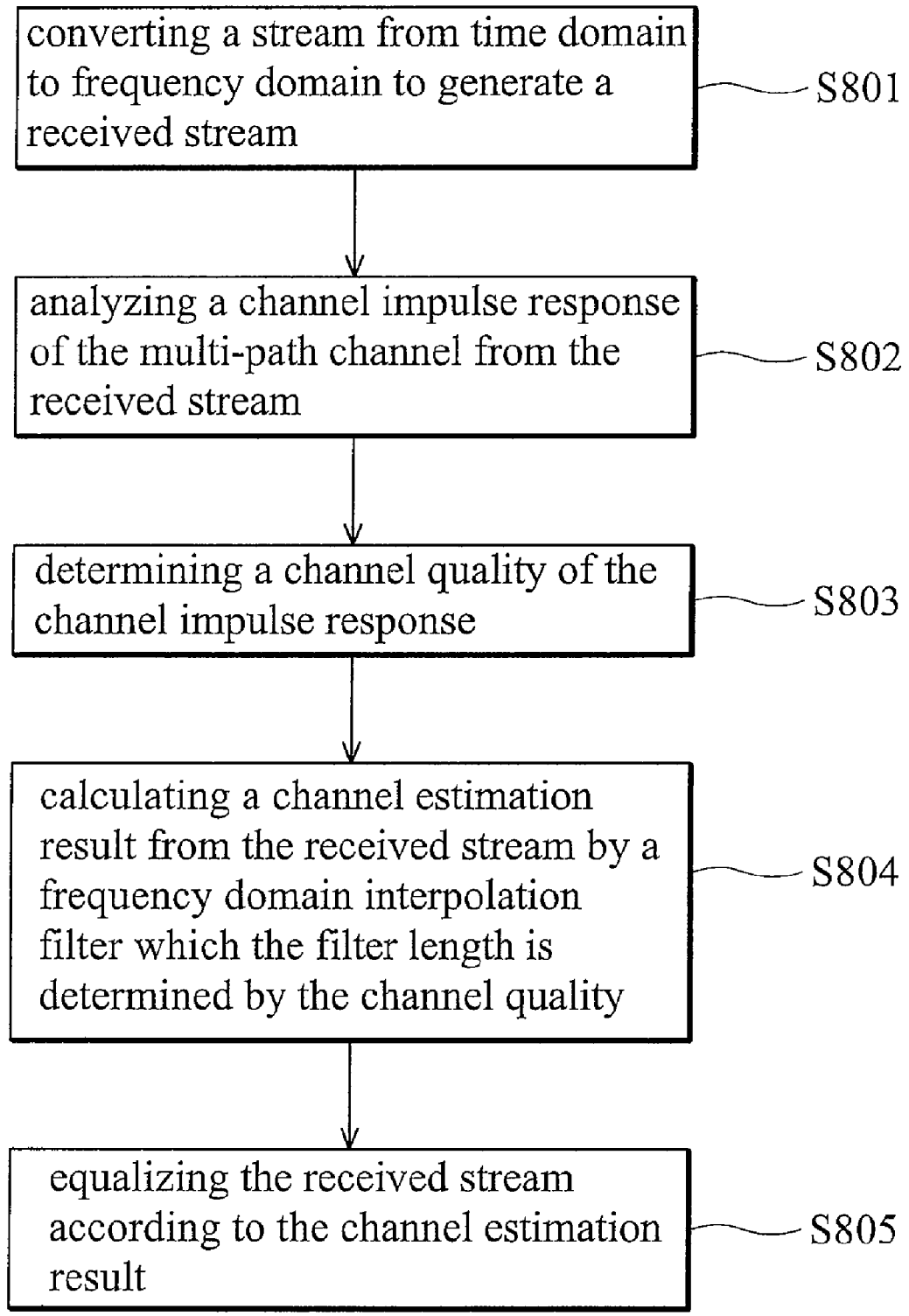
FIG. 8 shows a flowchart of a method of power adaptive equalization.

FIG. 8 shows a flowchart of a method for receiving a stream passing through a multi-path channel. The receiving method begins by converting a stream from time domain to frequency domain to generate a received stream in step S801. A channel impulse response of the multi-path channel is analyzed from the received stream in step S802. A channel quality of the channel impulse response is determined in step S803. A channel estimation result is calculated from the received stream by a frequency domain interpolation filter in step S804. An amount of power consumed by the frequency domain interpolation filter depends on the channel quality. In the embodiment, the power consumed by the frequency domain interpolation filter is related to the filter length thereof. Thus, the filter length of the frequency domain interpolation filter is short when channel quality is good, and the filter length of the frequency domain interpolation filter is long when the channel quality is poor. The received stream is then equalized in step S805 by an equalizer according to the channel estimation result. In some embodiments, the filter length of the frequency domain interpolation filter can be determined according to the length of the channel impulse response. In other embodiments, the filter length of the frequency domain interpolation filter is determined according to the numbers of paths in the channel impulse response that exceed an amplitude threshold.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multi-path receiving system having adaptive channel estimation for receiving a stream passing through a multi-path channel, comprising:
    a multi-path analyzer analyzing a channel quality of the multi-path channel from the received stream;
    a channel estimator comprising a frequency domain interpolation filter, controlling a filter length of the frequency domain interpolation filter according to the channel quality output from the multi-path analyzer, and calculating a channel estimation result from the received stream; and
    an equalizer equalizing the received stream based on the channel estimation result.

2. The multi-path receiving system as claimed in claim 1, wherein the channel quality comprises a channel impulse response, and the channel estimator controls the filter length of the frequency domain interpolation filter according to the channel quality, wherein a shorter filter length is selected when the channel quality is good and a longer filter length is selected when the channel quality is poor.

3. The multi-path receiving system as claimed in claim 2, wherein the filter length is determined according to the time distribution of the channel impulse response.

4. The multi-path receiving system as claimed in claim 2, wherein the filter length is determined according to the numbers of paths in the channel impulse response that exceed an amplitude threshold.

5. The multi-path receiving system as claimed in claim 2, wherein the channel estimator controls the filter length by determining the number of taps used for calculating the channel estimation result.

6. The multi-path receiving system as claimed in claim 2, wherein the channel estimator controls the filter length by determining the computational complexity for calculating the channel estimation result.

7. The multi-path receiving system as claimed in claim 1, further comprising a fast Fourier transform (FFT) module coupled to the equalizer and the channel estimator, converting the stream from time domain to frequency domain to generate the received stream for the channel estimator and the equalizer.

8. The multi-path receiving system as claimed in claim 1, wherein the multi-path analyzer comprises an inverse fast Fourier transform (IFFT) module, transforming the channel estimation result from frequency domain to time domain to generate the channel impulse response.

9. An adaptive channel estimation method, receiving a stream passing through a multi-path channel, comprising:
    analyzing a channel quality of the multi-path channel from the received stream;
    controlling a filter length of a frequency domain interpolation filter according to the channel quality;
    calculating a channel estimation result from the received stream by the frequency domain interpolation filter; and
    equalizing the received stream based on the channel estimation result.

10. The method as claimed in claim 9, further comprising:
    selecting a shorter filter length when the channel quality is good; and
    selecting a longer filter length when the channel quality is poor.

11. The method as claimed in claim 10, further comprising determining the channel quality according to the time distribution of a channel impulse response.

12. The method as claimed in claim 10, wherein the channel quality is determined according to the numbers of paths in a channel impulse response that exceed an amplitude threshold.

13. The method as claimed in claim 9, wherein the step of analyzing the channel quality further comprises converting the stream from time domain to frequency domain to generate the received stream.

14. An OFDM demodulator for demodulating a stream passing through a multi-path channel, comprising:
    an FFT module converting the stream into a plurality of pilot sub-carriers and data sub-carriers;
    a channel estimator comprising an interpolation filter, controlling a filter length of the interpolation filter according to a channel impulse response and generating a frequency response and a channel estimation result of the multi-path channel;
    an IFFT module, coupled to the channel estimator, generating the channel impulse response from the frequency response; and
    an equalizer equalizing the converted stream according to the channel estimation result.

15. The OFDM demodulator as claimed in claim 14, wherein the channel estimator determines a channel quality of the channel impulse response, and controls the filter length of the interpolation filter of the channel estimator according to the channel quality.

16. The OFDM demodulator as claimed in claim 15, wherein the filter length is determined according to the channel impulse response.

17. The OFDM demodulator as claimed in claim 15, wherein the filter length is determined according to the numbers of paths in the channel impulse response that exceed an amplitude threshold.

* * * * *